(12) United States Patent
Wang et al.

(10) Patent No.: US 8,674,955 B2
(45) Date of Patent: Mar. 18, 2014

(54) SENSING METHOD, COMPUTER PROGRAM PRODUCT AND PORTABLE DEVICE

(75) Inventors: Yu-Chun Wang, Taoyuan County (TW); Yu-Chen Huang, Taoyuan County (TW); Chi-Jung Tseng, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 328 days.

(21) Appl. No.: 13/093,857

(22) Filed: Apr. 26, 2011

(65) Prior Publication Data

US 2011/0260999 A1 Oct. 27, 2011

Related U.S. Application Data

(60) Provisional application No. 61/327,725, filed on Apr. 26, 2010.

(51) Int. Cl.
*G06F 3/041* (2006.01)

(52) U.S. Cl.
USPC ......................................................... 345/173

(58) Field of Classification Search
USPC ............. 345/156, 173–178; 178/18.01–18.11
See application file for complete search history.

(56) References Cited

U.S. PATENT DOCUMENTS

| 6,459,424 | B1 * | 10/2002 | Resman | 345/173 |
|---|---|---|---|---|
| 8,137,196 | B2 * | 3/2012 | Kando | 463/37 |
| 2007/0091075 | A1 | 4/2007 | Lii | |
| 2009/0174679 | A1 * | 7/2009 | Westerman | 345/173 |
| 2009/0225047 | A1 * | 9/2009 | Lee et al. | 345/173 |
| 2010/0110020 | A1 * | 5/2010 | Reeves et al. | 345/173 |
| 2010/0302172 | A1 * | 12/2010 | Wilairat | 345/173 |
| 2011/0074733 | A1 * | 3/2011 | Makinen et al. | 345/174 |
| 2011/0122159 | A1 * | 5/2011 | Bergsten et al. | 345/684 |
| 2011/0209099 | A1 * | 8/2011 | Hinckley et al. | 715/863 |

FOREIGN PATENT DOCUMENTS

| CN | 1838053 | | 9/2006 |
|---|---|---|---|
| CN | 101634935 | | 1/2010 |
| JP | 2006162267 | A * | 6/2006 |
| JP | 2006244154 | | 9/2006 |
| KR | 20080043170 | | 5/2008 |

OTHER PUBLICATIONS

"First Office Action of China Counterpart Application", issued on May 6, 2013, p. 1-p. 5, in which the listed references were cited.

* cited by examiner

*Primary Examiner* — Rodney Amadiz
(74) *Attorney, Agent, or Firm* — Jianq Chyun IP Office (57) ABSTRACT

The invention provides a sensing method for a portable device with a touch panel. The touch panel is sequentially divided into a valid input region, a transition region and a peripheral region from a center to a periphery of the touch panel. The sensing method comprises sensing a contact signal generated from a contact motion of an input device on the touch panel. When the initial position of the contact motion is determined to be within one of the valid input region and the transition region according to the contact signal or the initial position of the contact motion is determined to be within the peripheral region and the contact motion moves into the valid input region according to the contact signal, an operation corresponding to the contact motion is executed according to the contact signal.

18 Claims, 5 Drawing Sheets

SENSING METHOD, COMPUTER PROGRAM PRODUCT AND PORTABLE DEVICE

CROSS-REFERENCE TO RELATED APPLICATION

This application claims the priority benefit of U.S. provisional application Ser. No. 61/327,725, filed on Apr. 26, 2010. The entirety of the above-mentioned patent application is hereby incorporated by reference herein and made a part of this specification.

BACKGROUND

1. Field of the Invention

The invention relates to a sensing method, a computer program product and a portable device. Particularly, the invention relates to a sensing method, a computer program product and a portable device.

2. Description of Related Art

To cope with modern busy lifestyle, various portable electronic devices with less space occupation are continually developed. Taking a portable communication device such as a personal digital assistant (PDA) mobile phone or a smart phone as an example, it not only has various functions of a conventional communication device, but also allows a user to write documents, send and receive emails, browse websites, or use instant messaging software through an inbuilt windows operating system therein. Namely, such portable electronic device is not only used for making phone calls, but is also used to provide diversified functions as that does of a small personal computer. With development of wireless network technology, utilization of these functions is no longer limited by space and time, which is convenient for those modern people constantly pursuing efficiency.

With quick development of a pointing stick and touch pad technique, manufacturers of electronic products such as notebook computers, mobile phones or portable multimedia players, etc. generally use a touch screen to replace a conventional keyboard to server as a new generation of input interface. Taking the mobile phone as an example, when a user operates the conventional mobile phone, the user has to click the keyboard with fingers while referring to an image displayed on a screen, so as to input characters or select menus, etc. However, to operate a mobile phone integrating a touch screen, besides the fingers, the user may also use an auxiliary device such as a stylus to directly input characters on the screen or open application programs. Therefore, the touch screen provides the user a flexible and convenient input manner.

However, when the touch screen is in an unlock state, while the user holds the portable device having the touch screen, the user may inadvertently touch the touch screen, or when the user put the portable device into a handbag or pocket, the portable device is easy to be squeezed by other objects (for example, keys) in the handbag or the pocket, and even a hotkey on the portable device is pressed to inadvertently execute a specific function (for example, a phone call function), download unnecessary information or activate an unexpected operation, which may cause a trouble in using the portable electronic device.

SUMMARY OF THE INVENTION

The invention is directed to a sensing method, by which accuracy for determining whether a contact motion is a valid input signal is improved.

The invention is directed to a computer program product, which can reduce unexpected operations caused by miss touch of a touch panel.

The invention is directed to a portable device, which has high response accuracy for a touch signal.

The invention provides a sensing method for a portable device with a touch panel. The touch panel is sequentially divided into a valid input region, a transition region and a peripheral region from a center of the touch panel to a periphery of the touch panel. The sensing method comprises sensing a contact signal generated from a contact motion of an input device on the touch panel and determining an initial position of the contact motion on the touch panel according to the contact signal. When the initial position is determined to be within one of the valid input region and the transition region, an operation corresponding to the contact motion is executed according to the contact signal. When the initial position is determined to be within the peripheral region, it is determined whether the contact motion moves into the valid input region according to the contact signal. When the contact motion is determined to move into the valid input region, the operation corresponding to the contact motion is executed according to the contact signal. When the contact motion is determined not to move into the valid input region, the contact signal is ignored.

The invention also provides a computer program product loaded to a portable device. The portable device comprises a touch panel and a sensing module. The touch panel is sequentially divided into a valid input region, a transition region and a peripheral region from a center of the touch panel to a periphery of the touch panel. The sensing module is connected to the touch panel for sensing a contact signal generated from a contact motion of an input device on the touch panel. The portable device loads the program to execute following steps: determining an initial position of the contact motion of the input device on the touch panel and determining whether the contact signal is a valid input signal according to the initial position. When the initial position is determined to be within one of the valid input region and the transition region, the contact signal is regarded as the valid input signal. When the initial position is determined to be within the peripheral region, a moving direction of the contact motion is determined. When the moving direction reveals that the input device on the touch panel moves from the peripheral region to the valid input region, the contact signal is regarded as the valid input signal. When the moving direction does not reveal that the input device on the touch panel moves from the peripheral region into the valid input region, the contact signal is regarded as an invalid input signal.

The invention further provides a portable device. The portable device comprises a touch panel, a sensing module and a processor. The touch panel assembled on the portable device is sequentially divided into a valid input region, a transition region and a peripheral region from a center of the touch panel to a periphery of the touch panel. The sensing module connected to the touch panel is configured to sense a contact signal generated from a contact motion of an input device on the touch panel. The processor is configured to execute a computer readable program comprising a plurality of instructions. The instructions comprise determining an initial position of the contact motion according to the contact signal and, when the initial position is determined to be within one of the valid input region and the transition region, executing an operation corresponding to the contact motion according to the contact signal. When the initial position is determined to be within the peripheral region, determining whether the contact motion moves into the valid input region. When the contact motion is determined to move into the valid input region, the operation corresponding to the contact motion is executed according to the contact signal. When the contact motion is determined not to move into the valid input region, the contact signal is ignored.

According to the above descriptions, since the touch panel is sequentially divided into the valid input region, the transition region and the peripheral region from center portion to periphery, accuracy for determining whether the contact motion is the valid input signal is improved in determination of whether the user miss touches the touch panel. Moreover, the partition proportions of the valid input region, the transition region and the peripheral region on the touch panel are dynamically changed according to different behaviour modes of the contact motion, by which accuracy for determining whether the contact motion is the valid input signal is further improved. Therefore, unexpected operations due to miss touch of the touch panel occurred when the user holds the portable device can be reduced, and response accuracy of the portable device for the touch signal is improved.

DETAILED DESCRIPTION OF DISCLOSED EMBODIMENTS

Figure 1:
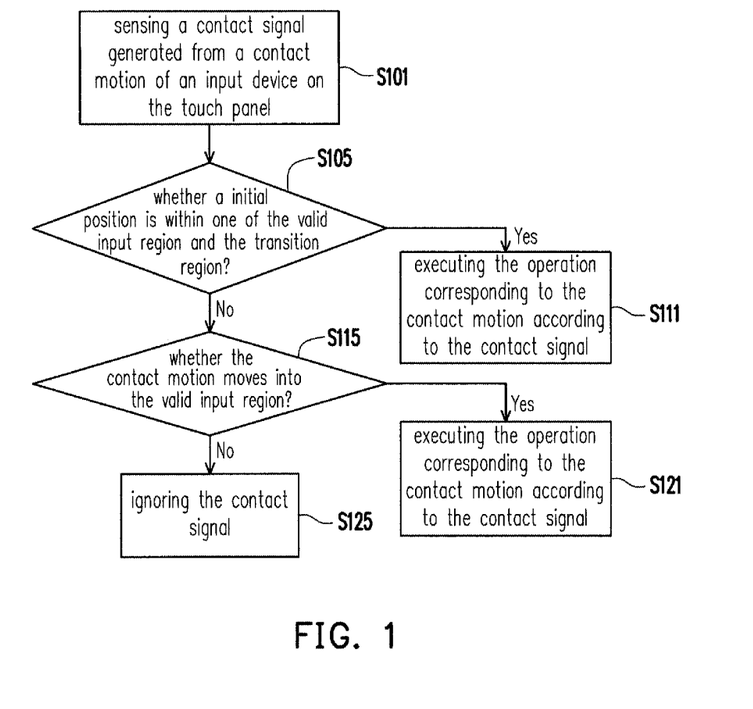
FIG. 1 is a flowchart illustrating a sensing method according to an embodiment of the invention.
Figure 2A:
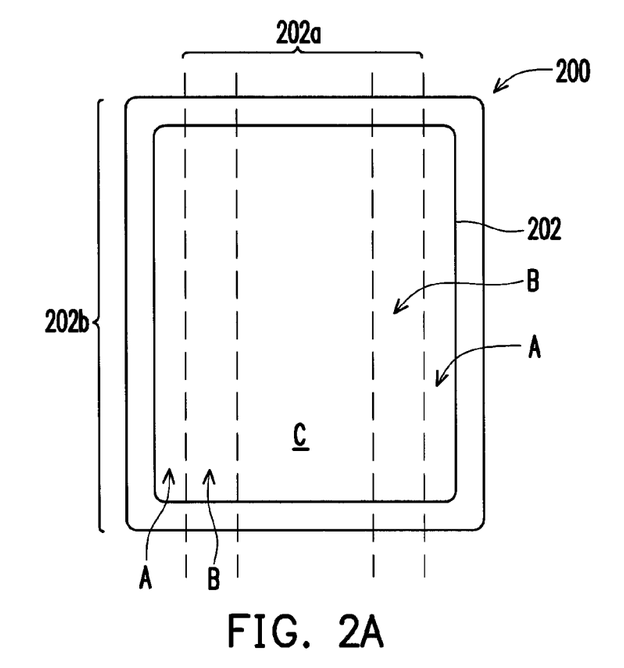
FIG. 2A is a schematic diagram of a portable device according to one embodiment of the invention.

FIG. 1 is a flowchart illustrating a sensing method according to an embodiment of the invention. Referring to FIG. 1, the sensing method of the embodiment is adapted to a touch panel of a portable device. The portable device is, for example, a portable computer, a personal digital assistant (PDA), a mobile phone, an electronic book or a console game machine. FIG. 2A is a schematic diagram of a portable device according to one embodiment of the invention. Referring to FIG. 2A, a touch panel 202 of the portable device 200 includes two pairs of opposite sides 202a and 202b, and the touch panel 202 is sequentially divided into a valid input region C, a transition region B and a peripheral region A from a center portion to at least one of the two pairs of opposite sides (for example, the pair of opposite sides 202b as that shown in FIG. 2). In an embodiment, an area of the peripheral region A close to a single side occupies about 0-10% of a total area of the touch panel 202, and an area of the transition region B close to a single side occupies about 0-14% of the total area of the touch panel 202. In another embodiment, an area of the peripheral region A close to a single side occupies about 3% of the total area of the touch panel 202, and an area of the transition region B close to a single side occupies about 7% of the total area of the touch panel 202.

In the sensing method of the embodiment, first, in step S101, the portable device 200 senses a contact signal generated from a contact motion of an input device on the touch panel through a sensing module (not shown). Then, in step S105, it is determined whether an initial position where the input device contacts the touch panel 202 to generate the contact motion is within one of the valid input region C and the transition region B.

Then, in step S111, when the initial position is determined to be within one of the valid input region C and the transition region B, the contact signal is regarded as a valid input signal, and an operation corresponding to the valid input signal is executed. That is, according to the contact signal, the operation corresponding to the contact motion is executed. It should be noticed that the operation is the controlling action applied on the portable device by the user through the contact motion on the touch panel.

In step S115, when the initial position is determined to be within the peripheral region A, it is determined whether a moving direction of the contact motion is towards the valid input region C (that is, it is determined whether the contact motion moves into the valid input region C).

In step S121, when the moving direction of the contact motion reveals that the input device on the touch panel 202 moves from the peripheral region A into the valid input region C (that is, the contact motion moves from the peripheral region A into the valid input region C), the contact signal is regarded as the valid input signal, and the operation corresponding to the valid input signal is executed. On the other words, according to the contact signal, the operation corresponding to the contact motion is executed.

Conversely, in step S125, when the moving direction does not reveal that the input device contacting the touch panel 202 moves from the peripheral region A into the valid input region C (that is, the contact motion does not move into the valid input region C), the contact signal is regarded as an invalid input signal, and the contact signal is ignored without accordingly executing any operation.

Figure 2B:
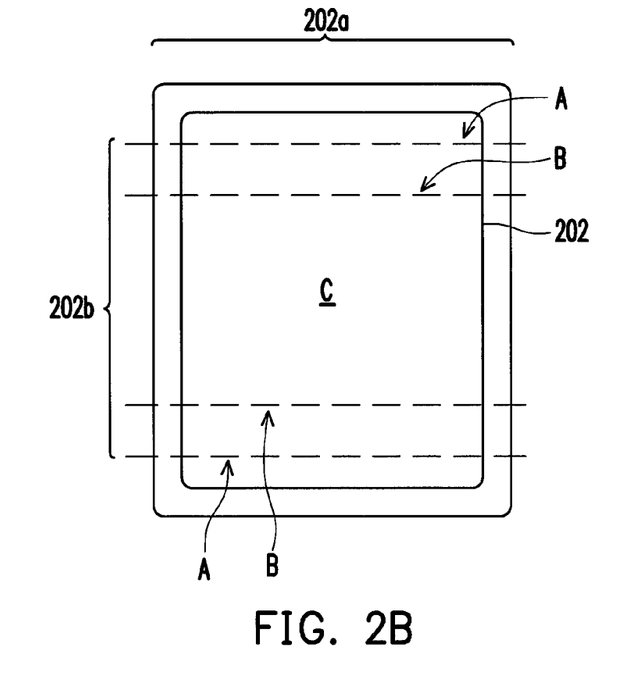
FIG. 2B is a schematic diagram of a portable device according to another embodiment of the invention.
Figure 2C:
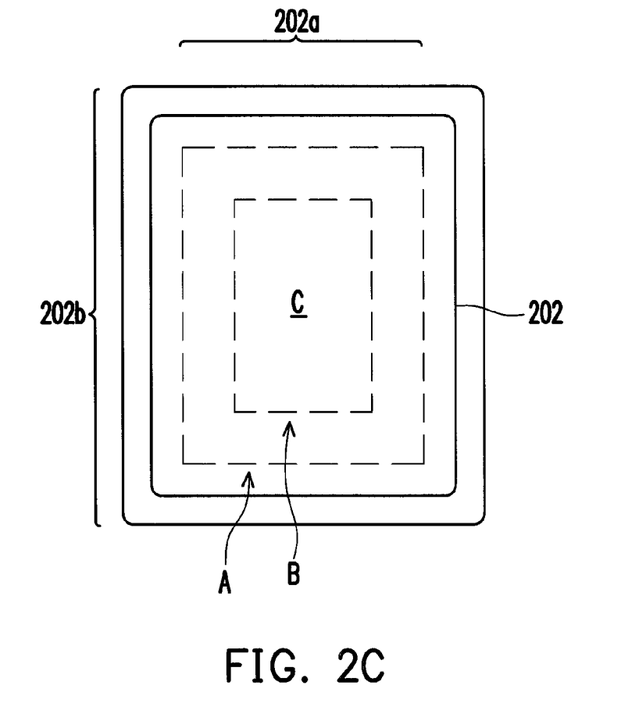
FIG. 2C is a schematic diagram of a portable device according to the other embodiment of the invention.

In the above embodiment, the touch panel 202 is sequentially divided into the valid input region C, the transition region B and the peripheral region A from the center portion of the touch panel 202 to a single pair of opposite sides 202b (which are the long opposite sides of the touch panel). However, the invention is not limited thereto, and in other embodiment as shown in FIG. 2B, the touch panel 202 can be sequentially divided into the valid input region C, the transition region B and the peripheral region A from the center portion of the touch panel 202 to the pair of short opposite sides 202a. In another embodiment, as shown in FIG. 2C, the touch panel 202 is sequentially divided into the valid input region C, the transition region B and the peripheral region A from the center of the touch panel 202 to the periphery of the touch panel 202 (the periphery of the touch panel includes two pairs of the opposite sides 202a and 202b).

Moreover, in the above embodiment, partition proportions of the valid input region C, the transition region B and the peripheral region A on the touch panel 202 are fixed. However, the invention is not limited thereto, and the partition proportions of the valid input region C, the transition region B and the peripheral region A on the touch panel 202 can be changed according to different behaviour modes of the input device contacting the touch panel 202. Namely, the partition proportions of the valid input region C, the transition region B and the peripheral region A on the touch panel 202 are dynamically changed according to different modes of the sensed contact motion which generates the contact signal.

Figure 3:
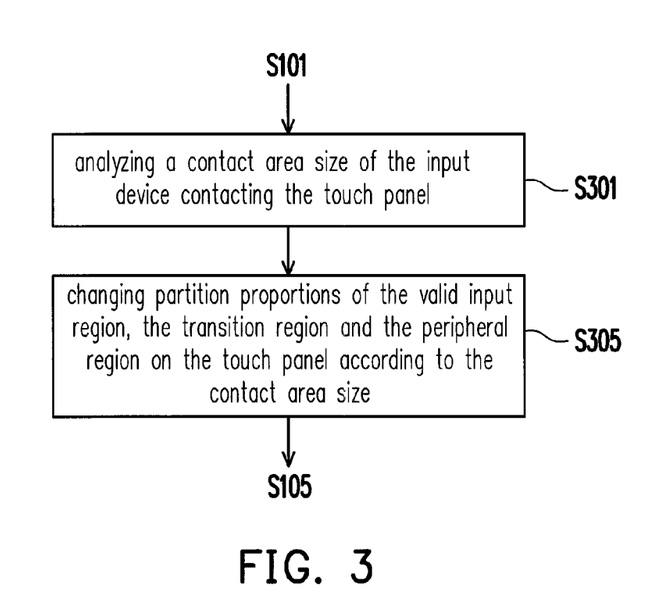
FIG. 3 is a flowchart illustrating a method for dynamically changing partition proportions of a valid input region, a transition region and a peripheral region on a touch panel according to an embodiment of the invention.

FIG. 3 is a flowchart illustrating a method for dynamically changing partition proportions of the valid input region, the transition region and the peripheral region on the touch panel according to an embodiment of the invention. Referring to FIG. 3, in an embodiment, before the step S105 of determining the initial position of the contact motion, the sensing method further includes a step S301, by which a contact area of the contact motion of the input device on the touch panel for generating the contact signal is determined. Then, in step S305, partition proportions of the valid input region C, the transition region B and the peripheral region A on the touch panel 202 are changed according to the contact area. In an embodiment, the partition proportion of the peripheral region A increases as the contact area increases, or decreases as the contact area decreases. In another embodiment, the partition proportion of the valid input region C decreases as the contact area increases, or increases as the contact area decreases.

Figure 4:
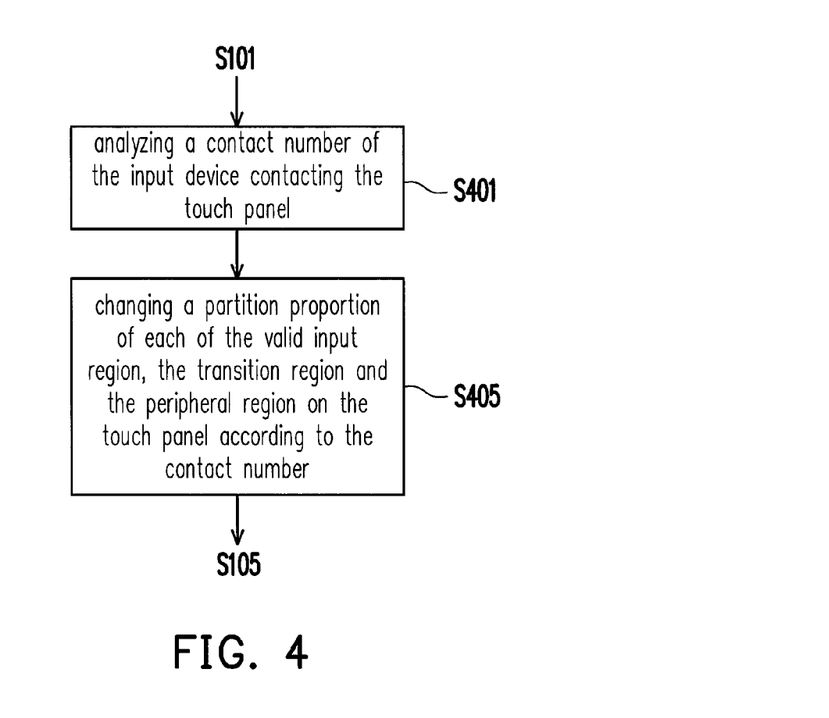
FIG. 4 is a flowchart illustrating a method for dynamically changing partition proportions of a valid input region, a transition region and a peripheral region on a touch panel according to an embodiment of the invention.

FIG. 4 is a flowchart illustrating a method for dynamically changing partition proportions of the valid input region, the transition region and the peripheral region on the touch panel according to an embodiment of the invention. Referring to FIG. 4, in another embodiment, before the step S105 of determining the initial position of the contact motion, the sensing method further includes a step S401, by which a contact number of the contact motion of the input device contacting the touch panel 202 to generate the contact signal is determined. The contact number is, for example, a total number of fingers used for generating a single contact motion. Then, in step S405, partition proportions of the valid input region C, the transition region B and the peripheral region A on the touch panel 202 are changed according to the contact number. In an embodiment, the partition proportion of the peripheral region A increases as the contact number increases, or decreases as the contact number decreases, and the partition proportion of the transition region B increases as the contact number increases, or decreases as the contact number decreases. In another embodiment, variation of the partition proportions of the peripheral region A and the transition region B along with the contact number can be obtained according to following equations (a) and (b):

$$AP = P + N \times 1.7\% \quad (a)$$

$$BP = T + N \times 1.7\% \quad (b)$$

where, AP represents the partition proportion of the peripheral region A, BP represents the partition proportion of the transition region B, P represents a basic partition proportion of the peripheral region A of about 0-10%, T represents a basic partition proportion of the transition region B of about 0-14%, and N represents the contact number.

Figure 5:
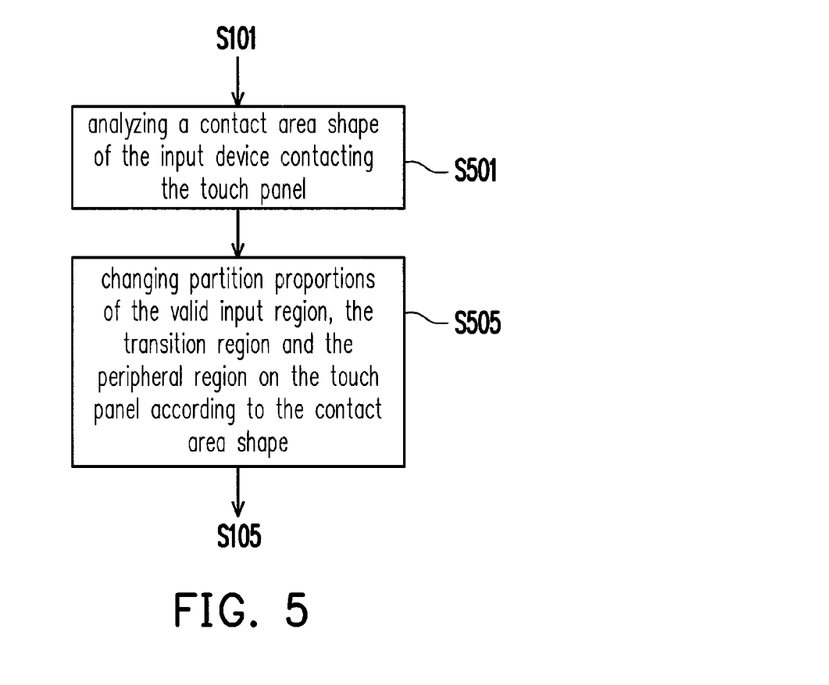
FIG. 5 is a flowchart illustrating a method for dynamically changing partition proportions of a valid input region, a transition region and a peripheral region on a touch panel according to an embodiment of the invention.

FIG. 5 is a flowchart illustrating a method for dynamically changing partition proportions of the valid input region, the transition region and the peripheral region on the touch panel according to an embodiment of the invention. Referring to FIG. 5, in another embodiment, before the step S105 of determining the initial position of the contact motion, the sensing method further includes a step S501, by which a contact area shape of the contact motion of the input device contacting the touch panel 202 for generating the contact signal is determined. Then, in step S505, partition proportions of the valid input region C, the transition region B and the peripheral region A on the touch panel 202 are changed according to the contact area shape. In an embodiment, the step S501 of determining the contact area shape includes determining a length ratio of a vertical axis (for example, a longest axis) to a horizontal axis (for example, a shortest axis) of the contact area shape. When the length ratio of the vertical axis to the horizontal axis is greater than or equal to three, the partition proportion of the peripheral region A on the touch panel 202 is increased.

Figure 6:
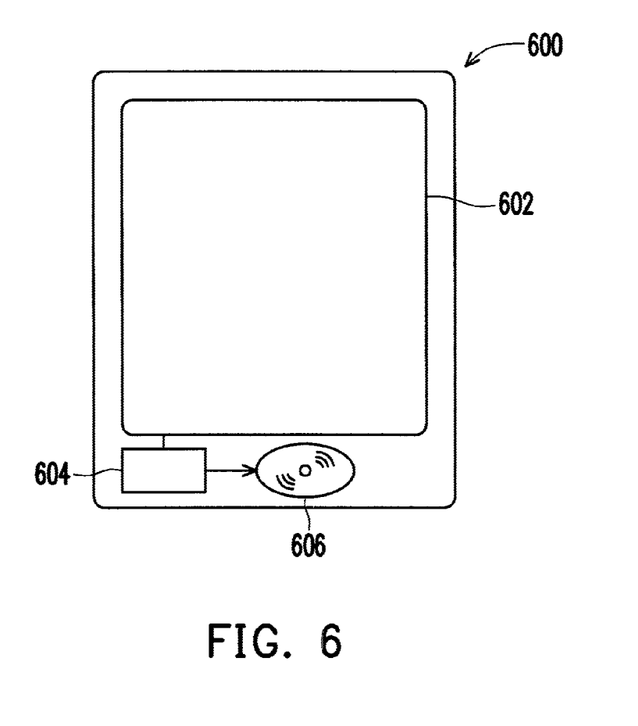
FIG. 6 is a schematic diagram of a portable device according to an embodiment of the invention.

FIG. 6 is a schematic diagram of a portable device according to an embodiment of the invention. Referring to FIG. 6, the portable device 600 of the invention executes the aforementioned sensing method, and includes a touch panel 602, a sensing module 604 and a processor 606. The touch panel 602 is assembled on the portable device 600. The sensing module 604 is connected to the touch panel 602 for sensing a contact signal generated from a contact motion of an input device on the touch panel 602. The processor 606 executes a computer readable program comprising a plurality of instructions. In the aforementioned embodiment, the sensing method of the invention can be implemented by executing the computer readable program. The computer readable program can be stored in a storage medium (not shown) of the portable device 600, and the processor 606 of the portable device 600 may execute the instructions of the computer readable program to implement the sensing method of the invention. In other words, the sensing method of the invention can be implemented by a computer program product, and a portable device is used to load the program to execute the aforementioned steps for implementing the sensing method of the invention. The steps of the sensing method (including the steps S101-S125, the steps S301-S305, the steps S401-S405 and the steps S501-S505) implemented by the processor 606 executing the instructions of the computer readable program or executed by the portable device loaded with the computer program product have been described in detailed in the aforementioned embodiment, and details thereof are not repeated.

In summary, in the invention, the touch panel is sequentially divided into the valid input region, the transition region and the peripheral region from the center portion of the touch panel to at least one of the two pairs of opposite sides or to both of the two pairs of opposite sides. When the initial position of the contact motion generating the contact signal is within the valid input region and the transition region, the contact signal is regarded as the valid input signal. On the other hand, when the initial position of the contact motion generating the contact signal is within the peripheral region, it has to be considered whether the contact motion has a moving direction making the input device moving into the valid input region. When the moving direction reveals that the input device moves into the valid input region, the contact signal is regarded as the valid input signal. Otherwise, the contact signal is regarded as an invalid input signal. Since the touch panel is sequentially divided into the valid input region, the transition region and the peripheral region from center portion to periphery, accuracy for determining whether the contact signal is the valid input signal is improved in determination of whether the user miss touches the touch panel. Moreover, the partition proportions of the valid input region, the transition region and the peripheral region on the touch panel are dynamically changed according to different behaviour modes of the contact motion, by which the accuracy for determining whether the contact signal is the valid input signal is further improved. Therefore, unexpected operations due to miss touch of the touch panel occurred when the user holds the portable device can be reduced, and response accuracy of the portable device for the touch signal is improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A sensing method for a portable device with a touch panel, wherein the touch panel is sequentially divided into a valid input region, a transition region and a peripheral region from a center of the touch panel to a periphery of the touch panel, the sensing method comprising:
    sensing a contact signal generated from a contact motion of an input device on the touch panel;
    determining an initial position of the contact motion on the touch panel according to the contact signal;
    when the initial position is determined to be within one of the valid input region and the transition region, executing an operation corresponding to the contact motion according to the contact signal;
    when the initial position is determined to be within the peripheral region,
        deteimining whether the contact motion moves into the valid input region through the transition region according to the contact signal;
        when the contact motion is determined to move into the valid input region through the transition region, executing the operation corresponding to the contact motion according to the contact signal; and
        when the contact motion is determined not to move into the valid input region, ignoring the contact signal.

2. The sensing method as claimed in claim 1, further comprising:
    determining a contact area of the input device on the touch panel according to the contact signal; and
    changing partition proportions of the valid input region, the transition region and the peripheral region on the touch panel according to the contact area.

3. The sensing method as claimed in claim 2, wherein the partition proportion of the peripheral region increases as the contact area increases, or decreases as the contact area decreases.

4. The sensing method as claimed in claim 2, wherein the partition proportion of the valid input region decreases as the contact area increases, or increases as the contact area decreases.

5. The sensing method as claimed in claim 1, further comprising:
    deteimining a contact area shape of the input device on the touch panel according to the contact signal; and
    changing partition proportions of the valid input region, the transition region and the peripheral region on the touch panel according to the contact area shape.

6. The sensing method as claimed in claim 1, further comprising:
    determining a contact number of the contact motion on the touch panel; and
    changing partition proportions of the valid input region, the transition region and the peripheral region on the touch panel according to the contact number.

7. A computer program product comprising a non-transitory computer readable storage medium, storing a computer readable program loaded to a portable device, wherein the portable device comprises a touch panel and a sensing module, the touch panel is sequentially divided into a valid input region, a transition region and a peripheral region from a center of the touch panel to a periphery of the touch panel, the sensing module is connected to the touch panel for sensing a contact signal generated from a contact motion of an input device on the touch panel, and a processor of the portable device executes instructions for: determining an initial position of the contact motion of the input device on the touch panel; determining whether the contact signal is a valid input signal according to the initial position, wherein: when the initial position is determined to be within one of the valid input region and the transition region, regarding the contact signal as the valid input signal; and when the initial position is determined to be within the peripheral region, determining a moving direction of the contact motion, wherein when the moving direction reveals that the input device on the touch panel moves from the peripheral region into the valid input region through the transition region, the contact signal is regarded as the valid input signal, and when the moving direction does not reveal that the input device on the touch panel moves from the peripheral region into the valid input region, the contact signal is regarded as an invalid input signal.

8. The computer program product as claimed in claim 7, wherein the steps executed by the portable device loading the program further comprise:
    determining a contact area of the input device on the touch panel; and
    changing partition proportions of the valid input region, the transition region and the peripheral region on the touch panel according to the contact area.

9. The computer program product as claimed in claim 8, wherein the partition proportion of the peripheral region increases as the contact area increases, or decreases as the contact area decreases.

10. The computer program product as claimed in claim 8, wherein the partition proportion of the valid input region decreases as the contact area increases, or increases as the contact area decreases.

11. The computer program product as claimed in claim 7, wherein the steps executed by the portable device loading the program further comprise:
    determining a contact area shape of the contact motion generated from the input device on the touch panel; and
    changing partition proportions of the valid input region, the transition region and the peripheral region on the touch panel according to the contact area shape.

12. The computer program product as claimed in claim 7, wherein the steps executed by the portable device loading the program further comprise:
    determining a contact number of the contact motion generated from the input device on the touch panel; and
    changing partition proportions of the valid input region, the transition region and the peripheral region on the touch panel according to the contact number.

13. A portable device, comprising:
    a touch panel, assembled on the portable device, wherein the touch panel is sequentially divided into a valid input region, a transition region and a peripheral region from a center of the touch panel to a periphery of the touch panel;
    a sensing module, connected to the touch panel, configured to sense a contact signal generated from a contact motion of an input device on the touch panel;
    a processor, configured to execute a computer readable program comprising a plurality of instructions, wherein the instructions comprise:
        determining an initial position of the contact motion according to the contact signal;
        when the initial position is determined to be within one of the valid input region and the transition region, executing an operation corresponding to the contact motion according to the contact signal;

when the initial position is determined to be within the peripheral region, determining whether the contact motion moves into the valid input region through the transition region;

when the contact motion is determined to move into the valid input region through the transition region, executing the operation corresponding to the contact motion according to the contact signal; and when the contact motion is determined not to move into the valid input region, ignoring the contact signal.

14. The portable device as claimed in claim 13, wherein the instructions further comprise:

determining a contact area of the input device on the touch panel according to the touch signal; and changing partition proportions of the valid input region, the transition region and the peripheral region on the touch panel according to the contact area.

15. The portable device as claimed in claim 14, wherein the partition proportion of the peripheral region increases as the contact area increases, or decreases as the contact area decreases.

16. The portable device as claimed in claim 14, wherein the partition proportion of the valid input region decreases as the contact area increases, or increases as the contact area decreases.

17. The portable device as claimed in claim 13, wherein the instructions further comprise:

determining a contact area shape of the input device on the touch panel according to the contact signal; and changing partition proportions of the valid input region, the transition region and the peripheral region on the touch panel according to the contact area shape.

18. The portable device as claimed in claim 13, wherein the instructions further comprise:

determining a contact number of the contact motion according to the contact signal; and changing partition proportions of the valid input region, the transition region and the peripheral region on the touch panel according to the contact number.

* * * * *